(12) United States Patent
Hosein

(10) Patent No.: US 7,760,751 B2
(45) Date of Patent: Jul. 20, 2010

(54) SYSTEM FOR SUPPORTING CONSECUTIVE AND DISTRIBUTED SUBCARRIER CHANNELS IN OFDMA NETWORKS

(75) Inventor: Patrick Hosein, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 589 days.

(21) Appl. No.: 11/691,611

(22) Filed: Mar. 27, 2007

(65) Prior Publication Data

US 2007/0268816 A1 Nov. 22, 2007

Related U.S. Application Data

(60) Provisional application No. 60/747,718, filed on May 19, 2006.

(51) Int. Cl.
*H04W 4/00* (2009.01)

(52) U.S. Cl. .................. 370/437; 370/329; 370/330; 455/450; 455/451; 455/452.1; 455/452.2

(58) Field of Classification Search .......... 370/208, 370/329, 330, 437; 455/450, 451, 452.1, 455/452.2

See application file for complete search history.

(56) References Cited

U.S. PATENT DOCUMENTS

| | | | |
|---|---|---|---|
| 6,571,009 B1 | 5/2003 | Nielsen et al. | |
| 6,571,099 B1 | 5/2003 | Kim et al. | |
| 6,980,811 B2 | 12/2005 | Harris | |
| 2002/0152342 A1 | 10/2002 | Das et al. | |
| 2003/0017830 A1 | 1/2003 | Kayama et al. | |
| 2003/0067935 A1 * | 4/2003 | Hosein | 370/437 |
| 2004/0258026 A1 * | 12/2004 | Lau | 370/335 |
| 2005/0111488 A1 * | 5/2005 | Subramanian et al. | 370/468 |
| 2005/0141454 A1 | 6/2005 | Jain et al. | |
| 2005/0180349 A1 | 8/2005 | Alamouti et al. | |
| 2005/0197129 A1 | 9/2005 | Cho et al. | |
| 2005/0265434 A1 | 12/2005 | Watanabe | |
| 2006/0003794 A1 | 1/2006 | Chung et al. | |
| 2006/0094363 A1 * | 5/2006 | Kang et al. | 455/63.1 |
| 2006/0256887 A1 * | 11/2006 | Kwon et al. | 375/260 |
| 2007/0004437 A1 | 1/2007 | Harada et al. | |
| 2007/0070905 A1 | 3/2007 | Oliver et al. | |
| 2007/0206623 A1 | 9/2007 | Tiedemann, Jr. et al. | |
| 2007/0263711 A1 * | 11/2007 | Kramer et al. | 375/222 |
| 2007/0263735 A1 | 11/2007 | Tong et al. | |

(Continued)

OTHER PUBLICATIONS

ZTE, E-UTRA Resource Allocation Design for Downlink, Nov. 7, 2005, 3GPP.*

(Continued)

*Primary Examiner*—Jason E Mattis
*Assistant Examiner*—Omer Mian
(74) *Attorney, Agent, or Firm*—Slater & Matsil, L.L.P.

(57) ABSTRACT

A system and method of downlink resource allocation to both Distributed Resource Channel (DRCH) and Localized Resource Channel (LRCH) users in an Orthogonal Frequency Division Multiple Access (OFDMA) network. A utility function is provided for each LRCH and DRCH user, wherein the utility function is concave and non-decreasing; a resource allocation objective is provided using the utility function of each LRCH and DRCH user; and resources are allocated to the LRCH and DRCH users such that the resource allocation objective is met.

43 Claims, 4 Drawing Sheets

U.S. PATENT DOCUMENTS

2009/0080575 A1 3/2009 Chuang et al.
2009/0196164 A1 8/2009 Vook et al.

OTHER PUBLICATIONS

"OFDMA MAC-PHY Section Details," IEEE 802.16 Broadband Wireless Access Working Group, Aug. 29, 2001, pp. 0-19.

"Downlink Multiplexing for EUTRA," 3GPP TSG-RAN WG1 Meeting #42bis, Tdoc R1-051220, Oct. 10-14, 2005, 5 pages, Samsung.

"E-URTA Resource Allocation Design for Downlink," 3GPP TSG-RAN WG1 #43, R1-051359, Nov. 7-11, 2005, 12 pages, ZTE.

"Updated Lucent-Nortel-Samsung proposal for Air Interface Evolution Phase 2," 3GPP2 TSG-C WG3, C30-20060327-018, Mar. 30, 2006, pp. 1, 29-34, 3GPP2.

Song, G., et al., "Adaptive Subcarrier and Power Allocation in OFDM Based on Maximizing Utility," The $57^{th}$ IEEE Semiannual Vehicular Technology Conference, Apr. 22-25 2003, 5 pages.

* cited by examiner

FIG. 2
$$r_i = \text{average throughput of user } i$$
$$q_i = \text{queue length of user } i$$
$$s_i = 0 \text{ (denotes the total served rate of } i\text{)}$$
$$\tilde{r}_i = ar_i \text{ (denotes the updated throughput)}$$
for $(t = 1:T; j = 1:M; i = 1:N)$ {
 $\quad d_{ijt} = \ln(1 + pg_{ij})$
 $\quad I_{ijt} = 0$
 $\quad$ if $(d_{ijt} < d_{min})$ $\{d_{ijt} = 0\}$
}
$d_{max} = 1$
while $(d_{max} > 0)$ {
 $\quad \{i^*, j^*, t^*\} = \arg\max_{\{i,j,t\}} \left\{\dfrac{d_{ijt}}{\tilde{r}_i}\right\}$
 $\quad d_{max} = d_{i^*j^*t^*}$
 $\quad$ if $(q_{j^*} \geq B\tau d_{i^*j^*t^*})$ {
 $\quad\quad I_{i^*j^*t^*} = 1$
 $\quad\quad s_{i^*} = s_{i^*} + d_{i^*j^*t^*}$
 $\quad\quad \tilde{r}_{i^*} = \alpha r_{i^*} + (1-\alpha) s_{i^*}$
 $\quad\quad \forall i \{d_{ij^*t^*} = 0\}$
 $\quad\quad q_{j^*} = q_{j^*} - B\tau d_{i^*j^*t^*}$
 $\quad$ }
 $\quad$ else $\{d_{i^*j^*t^*} = 0\}$
}

FIG. 3
$S = 0$
for $(i = 1:N)$ {
 $\quad I_i = 0$
 $\quad K_i \equiv \dfrac{\alpha r_i}{(1-\alpha) \ln(1 + pg_i)}$
 $\quad$ if $((q_i \geq B\tau \ln(1 + pg_i)) \&\& (g_i \geq g_{min}))$ $\{S = S \cup \{i\}\}$
}
for $(k = 1:MT)$ {
 $\quad i^* = \arg\min_{i \in S} \{I_i + K_i\}$
 $\quad I_{i^*} = I_{i^*} + 1$
 $\quad$ if $(q_{i^*} < B\tau(I_{i^*} + 1) \ln(1 + pg_{i^*}))$ $\{S = S \setminus \{i^*\}\}$
 $\quad$ if $(S == 0)$ {exit}
}

FIG. 4

$r_j$ = average throughput of user $j$
$q_j$ = queue length of user $j$
$s_j$ = 0 (denotes the total served rate of $j$)
$L$ = set of LRCH users
$D$ = set of DRCH users
$K$ = number of slots available for DRCH
$\tilde{r}_j = \alpha r_j$ (denotes the updated throughput)
$\forall (i \subset D)$ set $g_{ij} = g_j$; $y_j = 0$
$S$ = set of slots $\{j,t\}$ reserved for LRCH
for (t = 1 : T; j = 1 : M; i = 1 : N) {
 $\quad d_{ijt} = \ln(1 + \rho g_{ij})$
 $\quad I_{ijt} = 0$
 $\quad$ if $(d_{ijt} < d_{min})$ $\{d_{ijt} = 0\}$
 $\quad$ if $((i \in L)$ && $(\{j,t\} \notin S))$ $\{d_{ijt} = 0\}$
}
$d_{max} = 1$
while $((d_{max} > 0) \,||\, K > 0))$ {
 $\quad \{i^*, j^*, t^*\} = \arg\max_{\{i,j,t\}} \{U'_j(\tilde{r}_j) d_{ijt}\}$
 $\quad d_{max} = d_{i^*j^*t^*}$
 $\quad$ if $(q_{j^*} \geq B\tau d_{i^*j^*t^*})$ {
 $\quad\quad s_{j^*} = s_{j^*} + d_{i^*j^*t^*}$
 $\quad\quad \tilde{r}_{j^*} = \alpha r_{j^*} + (1-\alpha) s_{j^*}$
 $\quad\quad \forall i \, \{d_{ij^*t^*} = 0\}$
 $\quad\quad q_{j^*} = q_{j^*} - B\tau d_{i^*j^*t^*}$
 $\quad\quad$ if $(j^* \subset D)$ $\{y_{j^*}++; K--\}$ else $\{I_{i^*j^*t^*} = 1\}$
 $\quad$ }
 $\quad$ else $\{d_{i^*j^*t^*} = 0\}$
}
Allocate $K$ DRCH slots using $\vec{y}$

SYSTEM FOR SUPPORTING CONSECUTIVE AND DISTRIBUTED SUBCARRIER CHANNELS IN OFDMA NETWORKS

PRIORITY CLAIM

This application claims the priority of U.S. Provisional Application No. 60/747,718, filed May 19, 2006.

TECHNICAL FIELD OF THE INVENTION

The present invention relates generally to resource allocation in a wireless communication system. Specifically, the present invention relates to a system, comprising various methods and constructs, for downlink resource allocation to Distributed Resource Channel (DRCH) and Localized Resource Channel (LRCH) users in orthogonal Frequency Division Multiple Access (OFDMA) networks.

BACKGROUND OF THE INVENTION

In a wireless multiple access communication system, wireless traffic channel resources, e.g., bandwidth and time interval, are shared by all the wireless terminals, e.g., mobile units, in a particular cell. Efficient allocation of the traffic channel resources is very important, as it may directly impact utilization of the traffic channel resources, and Quality of Services (QoS) perceived by individual wireless terminal users. One such wireless communication system is the Orthogonal Frequency Division Multiplexing (OFDM) based Multiple Access system.

OFDM, as a combination of modulation and multiple access schemes, segments a communication channel for many users to share. Whereas Time Division Multiple Access (TDMA) segments according to time and Code Division Multiple Access (CDMA) segments according to spreading codes, OFDM segments according to frequency. OFDM is a technique that divides the spectrum into a number of equally spaced tones, and carries a portion of a user's information on each tone. Each of these equally spaced tones is also termed as a frequency subcarrier, because OFDM may be viewed as a form of frequency division multiplexing (FDM). Specifically, OFDM has an important property that each tone is orthogonal with every other tone and allows the spectrum of each tone to overlap. In addition, since these tones are orthogonal, they do not interfere with each other. By allowing the tones to overlap, the total amount of spectrum required is reduced.

OFDM may also be considered as a multiple access technique since an individual tone or groups of tones may be assigned to different users. Multiple users share a given bandwidth in this manner, yielding a system called orthogonal Frequency Division Multiple Access, or OFDMA. Each user may be assigned a predetermined number of tones when they have information to send, or alternatively, a user may be assigned a variable number of tones based on the amount of information the user has to send. The assignments are controlled by a Media Access Control (MAC) layer, which schedules resource assignments based on user demand.

OFDMA is a system in which a plurality of users may perform multiple access using OFDM. In a conventional OFDMA data transmission apparatus, a method is proposed to carry out both frequency division and time division when multiple access is performed. Also, to improve error correction capabilities, diversity is carried out in a frequency direction and in a time direction.

The recently defined 802.16 standard uses OFDM for physical layer transmissions, because OFDM has been shown to be robust against frequency selective fading. OFDM-based networks may provide users with high data rates with a much wider coverage than WiFi networks (802.11). OFDM-based networks may also support QoS services, and 802.16e may provide support for limited mobility. In OFDM networks, resources are scheduled in frequency, time and power domains. In the downlink, the rate achieved by a user increases with the number of subcarriers (frequency domain) assigned, the number of OFDMA symbols (time domain) assigned, and the fraction of Base Station (BS) power allocated. The same is true for the uplink, except that there is a limit on the total transmission power of each Subscriber Station (SS). Both uplink and downlink resource allocation are performed by a BS.

The downlink scheduling problem has been addressed recently. Conventional methods focus on maximizing the sum rate capacity with full buffer traffic. A utility-based approach is used to solve frequency dependent scheduling cases. Another approach focuses on distributed subcarrier channels. However, in each of these cases only a single type of user was considered. Therefore, what is needed is a novel approach that considers the case of mixed user types, and focuses on the problem of optimally dividing resources between users requiring frequency diverse channels and users requiring frequency dependent scheduling.

SUMMARY OF THE INVENTION

A system and method for downlink resource allocation to both Distributed Resource Channel (DRCH) and Localized Resource Channel (LRCH) users in an Orthogonal Frequency Division Multiple Access (OFDMA) network is provided. A utility function is provided for each LRCH and DRCH user, wherein the utility function is concave and non-decreasing; a resource allocation objective is provided using the utility function of each LRCH and DRCH user; and resources are allocated to the LRCH and DRCH users such that the resource allocation objective is met.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a segment of pseudo-code of a slot allocation algorithm for LRCH users with proportional fair utilities according to the present invention;

FIG. 3 illustrates a segment of pseudo-code for another slot allocation algorithm for DRCH users with proportional fair utilities according to the present invention; and FIG. 4 illustrates a segment of pseudo-code for optimally splitting given resources between and allocating given resources to LRCH and DRCH users according to the present invention.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Figure 1A:
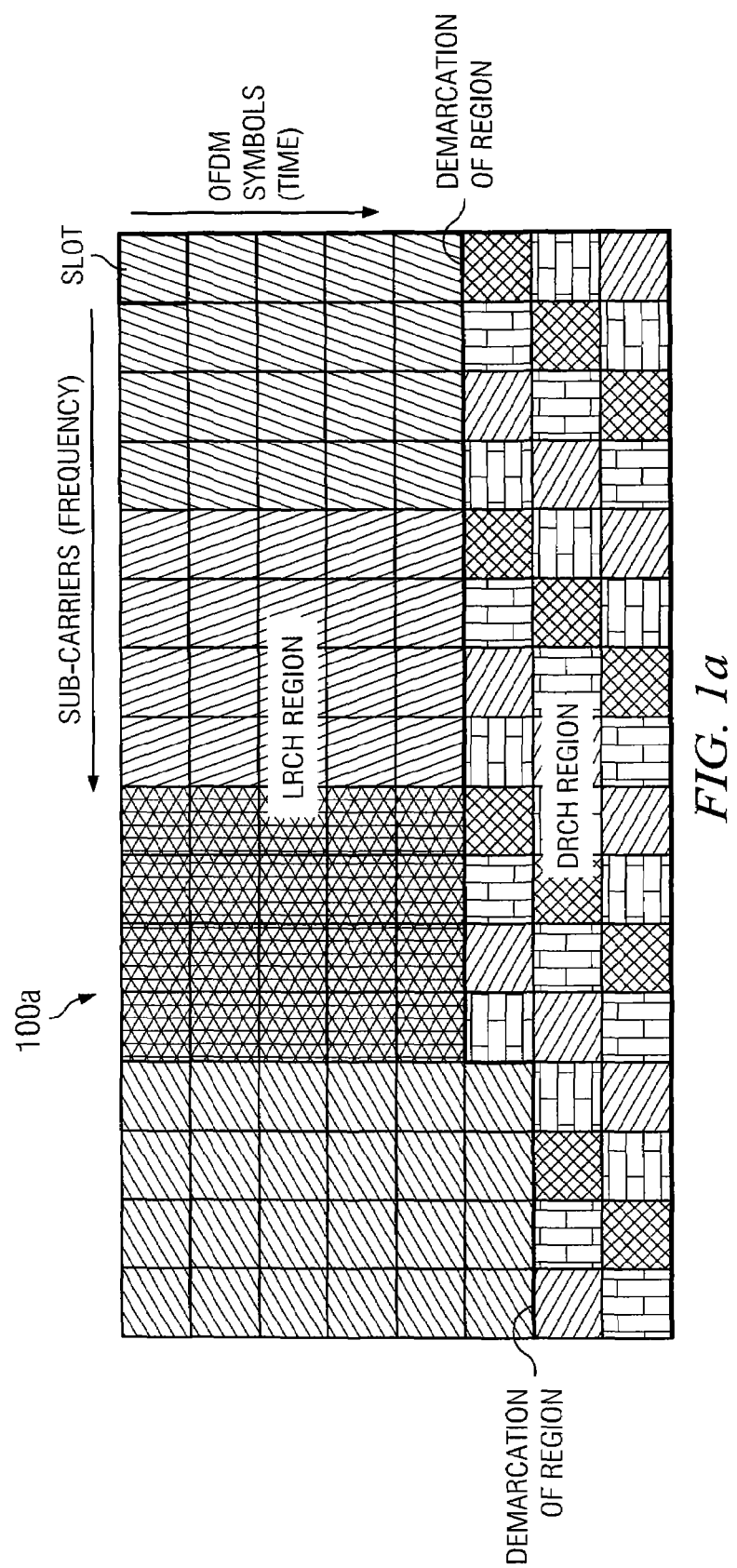
FIG. 1a is a diagram illustrating a forward link frame with a demarcation type according to the present invention.
Figure 1B:
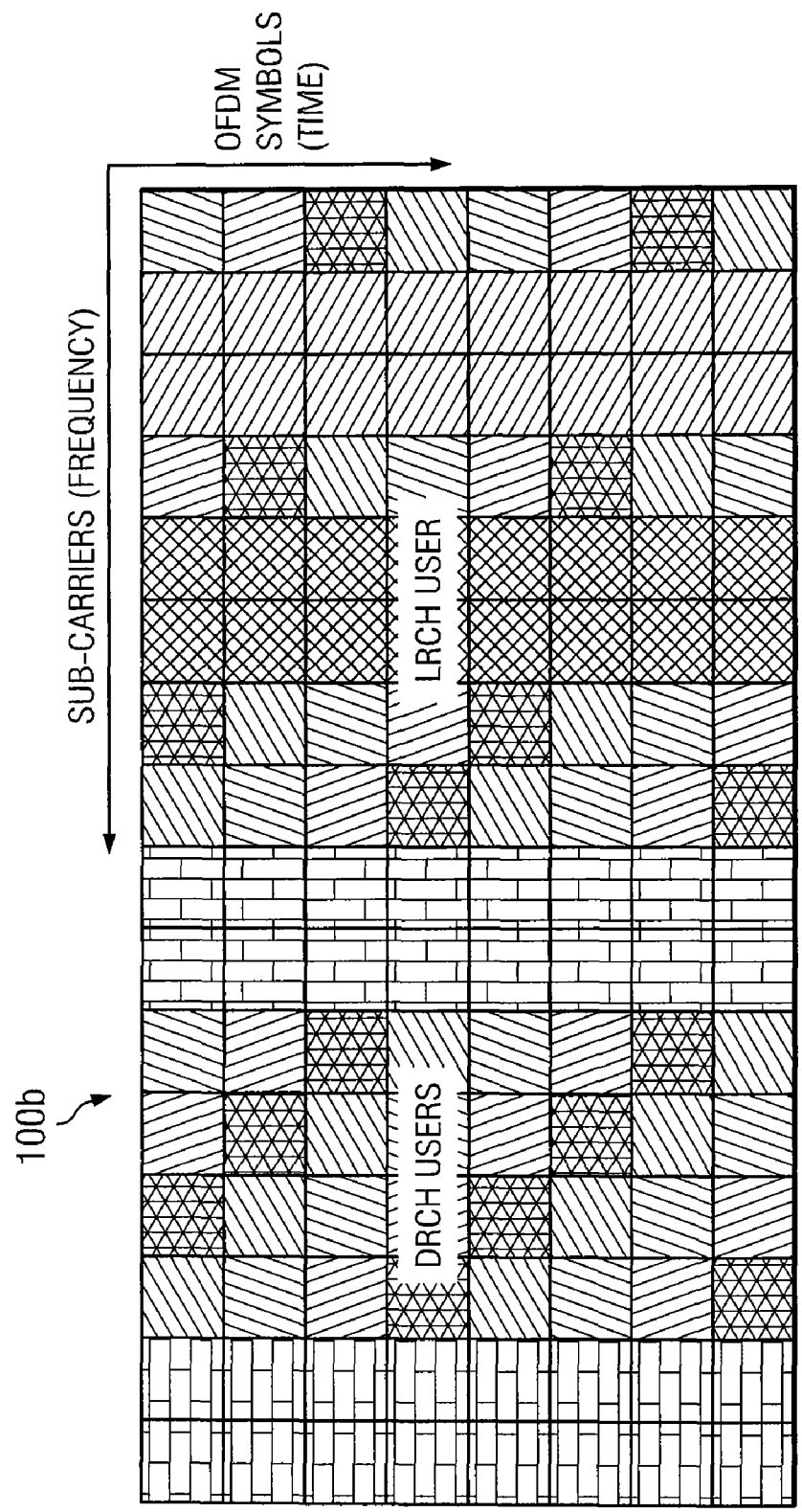
FIG. 1b is a diagram illustrating a forward link frame with another demarcation type according to the present invention.

Referring to FIGS. 1a and 1b, diagrams (100a) and (100b) illustrate a forward link frame consisting of multiple Orthogonal Frequency Division Multiplexing (OFDM) symbols with different demarcation types. Each symbol consists of multiple subcarriers or tones. A collection of a specified number of consecutive subcarriers of a single symbol is called a slot. Slots are combined in specific patterns to form channels. For example, a rectangular block of slots may be used to provide Localized Resource Channels (LRCHs). LRCHs are used for frequency dependent scheduling which takes advantage of frequency selective fading. Channels may also be constructed by choosing slots distributed in both frequency and time. This reduces the variance of achieved Signal to Interference and Noise Ratio (SINR) of a channel, especially when slots allocated to channels are varied from frame to frame. Such channels are referred to as Distributed Resource Channels (DRCHs), since the chosen resources are spread in both time and frequency domains, and are used for applications that require frequency diversity (e.g., delay sensitive applications for which near-deterministic servicing is preferred to maintain delay requirements). LRCH and DRCH channels are illustrated in FIGS. 1a and 1b, respectively.

Each slot consists of one symbol over a fixed number of consecutive subcarriers. Hence in FIGS. 1a and 1b, the vertical dimension is specified in terms of slots, but each of the slots is made up of multiple subcarriers. There are many ways to construct LRCH or DRCH channels and many ways to combine them. The present invention applies to any of these choices by including some appropriate constraints in the formulation. In the present invention, two simple construction options that have some practical advantages are considered. In FIG. 1a, LRCH channels are first allocated, followed by DRCH channels allocation. Each LRCH channel spans a finite number of symbols. Demarcation of the two types of channels may be uniquely determined by a single parameter, namely, the number of slots allocated to the DRCH region. This approach may be suitable when the number of DRCH channels is small. In FIG. 1b, each LRCH spans all symbols, and the remaining slots are used for DRCH channels. This scenario may be suitable when the number of LRCH channels is small. In this case, the LRCH allocations are signaled, and the leftover slots are used for DRCH allocations. A deterministic formula may be used to compute which slot is used for which user. In order to reduce inter-cell interference, allocations in the DRCH region may be dynamically varied. This prevents persistent collisions between assignments in adjacent sectors/cells. However, a person of the ordinary skill in the art will understand that, a randomization process for resource allocation may also be used. Other methods for signaling the demarcation to Subscriber Stations (SSs) may also be used.

In one embodiment for allocating resources in LRCH region, each user may be assigned a utility function of the user's throughput, and an objective is to maximize the total utility over all LRCH users. The utility function may vary from user to user, and is concave and non-decreasing. Each user may have a finite amount of data in the user's buffer for transmission. However, a person of the ordinary skill in the art will understand that finite buffer traffic models are necessary for low-rate, delay sensitive traffic such as Voice over IP (VoIP). A simple utility function that may be used is an average of throughput of a user. In this case, maximizing the utility function is equal to maximizing the user's throughput. More sophisticated utility functions may also be used. These utility functions include, but not limited to, a logarithm function which provides proportionally fair user throughput, and barrier functions that are used to maintain Quality of Service (QoS) guarantees.

A plurality of groups of consecutive (in frequency) slots may form an LRCH channel, and each SS in LRCH group may periodically report a forward link Signal to Interference and Noise Ratio (SINR) of each LRCH channel. However, users in DRCH group may report an average SINR over entire bandwidth. The optimization may be performed over two dimensions: assignment of channels to SSs and allocation of power to slots. The latter optimization may produce smaller performance gain (over a static allocation) compared with the former optimization.

Resource allocation is made based on a unit of a slot. In this embodiment, there are N users, i.e., N Subscriber Stations (SSs), and M subchannels, i.e., M slots during each symbol, with T OFDM symbols per frame. So, there are total of MT slots per frame. A Base Station (BS) may allocate, at most, P watts for downlink subchannels in each time-slot. Moreover, the power is equally spread among the M slots during each symbol, and so the power allocated to each slot is given by p=P/M. SINR, per unit transmission power, of a signal received at SS i over a slot j during a symbol, is denoted by $g_{ij}$. Hence, if transmission power of p is used to transmit a packet over slot j, then the SINR of a received signal is $pg_{ij}$.

For a given SINR, an appropriate modulation and coding scheme may be determined. Therefore, the maximum payload that may be carried in a transmitted frame may be determined. The shape of a mapping function between SINR and rate may closely follow a Shannon capacity function with some effective bandwidth B. This embodiment uses an overhead percentage that is constant for all modulation and coding schemes. Including this overhead factor in B, then the resulting function may provide a desired data payload rate. In addition, since natural logarithms, instead of base 2 logarithms, are used, a logarithm factor may be taken into account in the factor B. A Shannon rate, normalized to the effective bandwidth B, is denoted by d, and hence, $d=\ln(1+pg)$, where g denotes the SINR. A person of the ordinary skill in the art will understand that, although a real function for mapping SINR to rate is used in the embodiment of the present invention, other methods may also be used. These other methods include, but not limited to, a table for mapping reported SINRs to a fixed set of rates.

An average throughput of a user at the start of a frame being scheduled is denoted by r. A throughput dependent utility function may be assigned to each user. This function, which may vary for different SSs, may represent utility to a user of a corresponding throughput achieved, and is denoted by U(r). However, a person of the ordinary skill in the art will understand that, utility functions that are dependent on other metrics (such as queue size, delay, etc.) may also be used in the present invention.

Let $x_{ijt}$ denote a decision variable. $x_{ijt}$ equals one if a slot j is assigned to an SS i during symbol t, and zero otherwise. Let X denote an N×M×T matrix, in which entry (i, j, t) equals $x_{ijt}$. Therefore, the total (normalized as described above) rate achieved by user i, denoted by $d_i$, may be given by:

$$d_i = \sum_{t=1}^{T} \sum_{j=1}^{M} x_{ijt} \ln(1 + pg_{ij}) \quad (1)$$

Let $r_i$ and $\tilde{r}_i$ denote average throughput of SS i before and after frame transmission, respectively. A throughput of SS i may be updated using the total achieved rate $d_i$ as follows:

$$\tilde{r}_i(X) = \alpha r_i + (1-\alpha) d_i(X) \quad (2)$$

where $0 < \alpha < 1$ is a filter constant that may be chosen based on a desired time frame, over which the utility requirement is averaged and $d_i$ is given by (1).

The size of data queue of a user before transmission of a concerned frame is denoted by q. Since data queued for each user is finite, a user may need to be ensured to have only scheduled slots when data is available to be filled. For a given allocation X, an achievable rate for SS i is $Bd_i(X)$ kbps. If the duration of a symbol is denoted by $\tau$, then the queue constraint becomes $Bd_i(X)\tau \leq q_i$.

In one embodiment, the resulting optimization problem may be formulated and solved using a gradient ascent algorithm. This algorithm is described in the follows. Derivative of an objective function, i.e., utility sum of all LRCH users, with respect to a decision variable $x_{ijt}$ evaluated before the transmission is given by:

$$\left. \frac{\partial F(X)}{\partial x_{ijt}} \right|_{X=0} = (1-\alpha) U_i'(r_i) \ln(1 + pg_{ij}) \quad (3)$$

The gradient ascent algorithm may be performed over all subchannels and time-slots. A triplet $\{i, j, t\}$ with the largest gradient may be found, such that a user has sufficient data for a corresponding slot. The slot j at symbol t may then be allocated to a corresponding user i. Next, throughput of user i may be updated, since a gradient is affected by the fact that the user's throughput has increased. Then, queue size of the user $q_i$ is decremented based on the payload of the slot transmission of the user. This procedure may be repeated until either all slots are allocated, or all data queues are empty. In practice, there is a minimum rate that is supported.

Consider a case of $U(r) = r$, which provides the maximum throughput. In this case, the derivative of $U(r)$ is simply unity, and hence, from Equation (3), the maximum gradient user is the one with the largest value of $\ln(1 + pg_{ij})$. Thus one may easily see that the maximum gradient procedure allocates each slot to a user with the largest achievable rate, and that has sufficient data for the slot. For the case $U(r) = \ln(r)$, proportionally fair rates are obtained and $U'(r) = 1/r$. A segment of pseudo-code in case of this type of utility function is provided in diagram (200) of FIG. 2. The algorithm iteratively picks a slot with the largest gradient, assigns a corresponding user to the slot, updates the user's throughput and queue size, and then repeats the procedures.

In another embodiment for allocating resources in DRCH region, an entire frame consists of a single DRCH region. This embodiment includes N users and M subchannels, i.e., M slots during each symbol, with T data symbols per frame. A BS may allocate, at most, P watts for the downlink subchannels in each time-slot. Moreover, power allocated to each slot is denoted by p=P/M. In this embodiment, for each user, the SINR of a signal received by a particular SS is the same for all slots, since an average Carrier to Interference (C/I) ratio taken over all subcarriers is reported by the SS to the BS. SINR of a signal received at an SS per unit transmission power is denoted by g. Hence if transmission power of p is used to transmit a packet over a channel, then the SINR of a received signal is pg.

An achievable slot rate of an SS may be the same for all slot positions, since the power and SINR are the same for all slots. Therefore, only the number of slots that may be allocated to each user needs to be determined. Then, a user's slots may be allocated in some predetermined manner. The number of slots allocated to an SS i is denoted by $x_i$. Thus the total (normalized) rate achieved by the SS i is given by:

$$d_i(x_i) = x_i \ln(1 + pg_i)$$

where p is the slot transmission power, and $g_i$ is the per-slot SINR for all slots allocated to SS i within a frame.

The average throughput of a user at the start of a frame being scheduled is denoted by r. A throughput dependent utility function, U(r), is assigned to each user. Let $r_i$ and $\tilde{r}_i$ denote an SS's average throughput before and after the frame transmission, respectively. The throughput may be updated using $x_i$ as follows:

$$\tilde{r}_i(x_i) = \alpha r_i + (1-\alpha) d_i(x_i) = \alpha r_i + (1-\alpha) x_i \ln(1 + pg_i) \quad (4)$$

where $\alpha$ is a filter constant.

Using the same terminology and conditions described for the LRCH case, and with a decision variable which is the number of slots allocated to each SS, an optimization problem may be formulated and solved using a gradient ascent algorithm. For a Proportional Fair utility function, the resulting pseudo-code of the algorithm is given in diagram (300) of FIG. 3.

In an alternative embodiment, resources are allocated to a mixed types of users—LRCH users and DRCH users. When number of slots allocated to the DRCH and LRCH regions, respectively, is known, allocations for DRCH type and LRCH type of users may be simultaneously solved. The number of slots to be allocated to DRCH and LRCH users may be pre-determined. Alternatively, an optimal number of slots for the LRCH and DRCH region may also be determined, respectively, when determining the optimal allocations to LRCH and DRCH users.

Each user may be assigned a utility function of the user's throughput, delay, data queue size, or other parameters, and an objective is to maximize the total utility over all LRCH users or all DRCH users. The utility function may vary from user to user. The utility function is concave and non-decreasing.

Referring now to FIG. 3, in connection with FIG. 2, a pseudo-code for a Slot Allocation Problem using Proportional Fair Utilities is described. The algorithm for the DRCH case is a special case of the LRCH case, in which $g_{ij} = g_i$ for all SSs. In other words, forward link radio conditions are independent of subchannels. This will be shown in the following.

Consider the algorithm specified in FIG. 2, if $g_{ij} = g_i$, then $d_{ijt} = \ln(1 + pg_i)$ for all i, j, t. Therefore, the achievable rate of a user i may be denoted by $d_i$, since i is the same for all slots. The algorithm therefore finds a user with the maximum value of ratio $d_i/\tilde{r}_i$, and may allocate any one of the slots to the SS. Each time a slot $s_i$ is allocated to a user, a total served rate for the slot $s_i$ is updated, and the user's throughput is then updated based on the user's new total served rate. If a total of $x_i$ slots have so far been allocated to an SS i, then the next SS to be allocated a slot is the one that has sufficient data for the slot, and for which $d_i/(\alpha r_i+(1-\alpha)x_id_i)$ is the largest among all users.

Referring now to the algorithm for the DRCH case in FIG. 3, if $x_i$ slots have been allocated to user i, then the next slot may be allocated to a user that has sufficient data for the slot, and for which $(x_i+k_i)$ is the smallest. If $k_i$ is substituted, then the latter condition corresponds to an SS with the largest ratio $(1-\alpha)d_i/(\alpha r_i+(1-\alpha)x_id_i)$. This is exactly the same user that would have been chosen in the LRCH algorithm. Hence, the LRCH algorithm provides the same solution as the DRCH algorithm, when channel conditions are independent of the sub-bands. This is true since both algorithms are optimal. Therefore, the LRCH algorithm may be used for both LRCH and DRCH users, by setting $g_{ij}=g_i$ for all DRCH users.

An optimal number of slots to be allocated to the LRCH region and DRCH regions may be determined, respectively, under a constraint that the regions are demarcated as illustrated in FIG. 1a or FIG. 1b. However, A person of the ordinary skill in the art will understand, this may not necessarily be the optimal allocation of LRCH and DRCH resources, since those demarcations are not shown to be optimal. Nevertheless, the demarcation methods may be chosen for the simplicity of design and implementation.

An optimal size of each region may be determined given a demarcation method. A convex optimization is described below that may be solved with simple search algorithms.

Referring back to FIGS. 1a and 1b, the same approach may be used for determining the optimal division of resources for both demarcation types. In one embodiment, in the case of FIG. 1a, an LRCH user is to be allocated resources up to the demarcation point. If a DRCH user is chosen for scheduling, then the DRCH user may be allocated to any one of the slots in the DRCH region. In an alternative embodiment, in the case of FIG. 1b, if an LRCH user is to be scheduled, the LRCH user is allowed to use slots across the entire symbol range. A DRCH user is to be scheduled a slot as long as there are slots available in the DRCH region. Specific placement of these slots needs to be made on completion of the algorithm, since those slots used by the LRCH users may not be used.

The total number of slots allocated to the DRCH users is denoted by $k_s$, and the total number of slots allocated to the LRCH users is denoted by $k_l$. The sum $k_d+k_l$ must satisfy $(k_d+k_l)\leq MT$, where MT is the total number of slots per frame. Let $F^*_L(k_l)$ denote the objective function values of the optimal allocation of LRCH users, given that $k_l$ slots were allocated to the LRCH users. Similarly, let $F^*_D(k_d)$ denote objective function values for the optimal allocation of DRCH users, given that $k_d$ slots were allocated to the DRCH users.

The analysis described below may apply to both functions $F^*_D$ and $F^*_L$. The subscripts are dropped in analysis, and a function $F^*(k)$ is considered in the following. The function $F^*(k)$ only exists at integer values of k, because integer slots are allocated to each region. Now consider the piecewise linear function F(k) that is linear in between integer values of k, and is equal to F(k) at integer values of k. By relaxing the integer slot constraint, the function F(k) over real values of k may be optimized. Then an optimal point is shown that exists, at which k is integral. Thus this is also the optimal point for the original integer constrained problem.

First, F(k) is shown to be a concave function by showing that a derivative of F(k) is non-increasing and hence, a second derivative of F(k) is non-positive. Accordingly, the function F(k) is concave. For both algorithms, each successive slot is allocated to a user with a maximum gradient. The maximum gradient may be shown to be a non-increasing function. If the maximum gradient is not a non-increasing function, then the present maximum gradient is larger than the one for the previous allocation. If both allocations are for different users, then the present maximum gradient would have been maximized in the previous iteration, as well leading to a contradiction. If both allocations are for the same user, then the user's gradient, as a function of slots allocated, increases implying that it is non-concave. This is also a contradiction. Therefore, the maximum gradient chosen at each iteration is non-decreasing, meaning that the gradient of F as a function of k is non-increasing at integer values of k.

However, the embodiments described in the present invention are only true at integer values of k. Thus the notion that function F(k) is concave may not be always made even though this is true in most practical situations. If a primal ascent algorithm is used, then F(k) may be ensured to be concave. In the primal ascent algorithm, instead of allocating a slot to a user with the maximum gradient, the slot is allocated to a user, for which the incremental increase in an objective function is the largest. Typically, both algorithms produce the same result. In the primal ascent case, the incremental increase in F(k) is a decreasing function of k, and hence, the function is concave.

Accordingly, both $F^*_L(k_l)$ and $F^*_D(k_d)$ are concave functions, and a sum must be maximized, given the constraint that $k_l+k_d$, at optimality, is no larger than the total number of data slots. First, an optimal point occurs at integer values of $k_l$ and $k_d$. If this is not the case, and if the gradients of functions $F^*_L$ and $F^*_D$ are not equal, then the sum of the objective functions may be increased by decreasing the allocation to the smaller gradient function and increasing the allocation to the other. If the gradients are equal at optimality, then the same may be done (reallocate resources until integer solutions are obtained) except that in this case, the objective function sum does not change. The resulting problem is therefore a one dimensional maximization of a concave function which may be solved with simple search algorithms, such as a binary search or the like. Define $D(k)=F^*_D(k)+F^*_L(MT-k)$, then the optimal number of slots that may be allocated to DRCH users is given by $k^*=\arg \max_k\{D(k)\}$, with the remaining slots being allocated to LRCH users.

For the demarcation depicted in FIG. 1a, D(k) may be obtained using a segment of pseudo-code described in diagram (400) of FIG. 4. In addition, FIG. 4 illustrates an objective function value for a given resource split.

For the demarcation given in FIG. 1b, a similar approach may be used. In this case, LRCH assignments may be made in any slot without restrictions. Once the total allocated number of LRCH slot assignments is reached, then further assignments are made only for DRCH users. If the total allocated number of DRCH users is instead reached, then further assignments are made only for LRCH users. On termination, the specific DRCH slot assignments to users are made. The problem may be solved for both types of demarcations, and the one resulting in a larger objective function value should then be used. In practice, the demarcation type and allocation need not be performed for each frame, but may be performed after some specified number of frames.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of a base station allocating downlink resources to a group of Distributed Resource Channel (DRCH) user devices and a group of Localized Resource Channel (LRCH) user devices in an Orthogonal Frequency Division Multiple Access (OFDMA) network, comprising the steps of:

providing a utility function for each of the group of LRCH user devices and each of the group of DRCH user devices, wherein the utility function is concave and non-decreasing;

providing a resource allocation objective using the utility functions of the group of LRCH user devices and the group of DRCH user devices, providing the resource allocation objective comprising optimizing a utility sum of the group of LRCH user devices based on the utility function for each of the group of LRCH user devices to produce a utility sum of the group of LRCH user devices having optimal resource allocation, and optimizing a utility sum of the group of DRCH user devices based on the utility function for each of the group of DRCH user devices to produce a utility sum of the group of DRCH user devices having optimal resource allocation;

allocating the resources to the group of LRCH user devices and the group of DRCH user devices such that the resource allocation objective is met, allocating the resources comprising maximizing a sum of the utility sum of the group of LRCH user devices with an optimal resource allocation and the utility sum of the group of DRCH user devices with an optimal resource allocation; maximizing comprising adjusting a number of slots allocated to a plurality of Localized Resource Channels (LRCHs) and adjusting a number of slots allocated to a plurality of Distributed Resource Channels (DRCHs); and the base station causing the group of LRCH user devices and the group of DRCH user devices to operate according to the allocating.

2. The method of claim 1, wherein the utility function provided to a user device is dependent on throughput of the user device.

3. The method of claim 2, wherein the utility function provided to a user device is an average throughput of the user device.

4. The method of claim 2, wherein the utility function provided to a user device is a logarithm function of throughput of the user device.

5. The method of claim 2, wherein the utility function provided to a user device is a barrier function of throughput of the user device.

6. The method of claim 1, wherein the utility function provided to a user device is dependent on data queue size of the user device.

7. The method of claim 1, wherein the utility function provided to a user device is dependent on delay of the user device.

8. The method of claim 1, wherein the step of allocating the resources further comprises:

providing a demarcation type to demarcate at least one data frame, such that the at least one data frame comprises the plurality of DRCHs and the plurality of LRCHs;

determining an optimal number of slots for the plurality of LRCHs and the plurality of DRCHs, respectively; and performing optimal allocation of the plurality of LRCHs and the plurality of DRCHs to the group of LRCH user devices and the group of DRCH user devices, respectively, using the optimal number of slots determined.

9. The method of claim 8, wherein the demarcation type for the at least one data frame is provided such that the plurality of LRCHs span a finite number of symbols of the at least one data frame.

10. The method of claim 8, wherein the demarcation type for the at least one data frame is provided such that the plurality of LRCHs span entire symbols of the at least one data frame.

11. The method of claim 8, wherein the steps of determining the optimal number of slots and performing optimal allocation are performed by an algorithm comprising the steps of:

choosing a number of slots for the plurality of LRCHs or the plurality of DRCHs;

allocating the plurality of LRCHs to the group of LRCH user devices, such that utility sum of the group of LRCH user devices is maximized;

allocating the plurality of DRCHs to the group of DRCH user devices, such that the utility sum of the group of DRCH user devices is maximized; and repeating the previous three steps, until the sum of utility sum for the group of LRCH user devices and the utility sum for the group of DRCH user devices is maximized;

wherein the total number of slots for the plurality of LRCHs and the plurality of DRCHs is predetermined, each of the group of LRCH user devices or each of the group of DRCH user devices has a finite data queue, and transmission power is equally spread among all the slots during each symbol of the at least one data frame.

12. The method of claim 11, wherein the step of allocating the plurality of LRCHs to the group of LRCH user devices or the step of allocating the plurality of DRCHs to the group of DRCH user devices is performed by a gradient ascent algorithm.

13. The method of claim 12, wherein the gradient ascent algorithm comprising the steps of:

determining a triplet {user i slot j, symbol t}, by looking for the largest gradient of the utility sum of the group of LRCH user devices or the group of DRCH user devices, wherein slot j at symbol t is allocated to user device i;

updating throughput of user device i;

reducing data queue size of user device i; and repeating the previous three steps until all slots for the plurality of LRCHs or the plurality of DRCHs on the at least one data frame are allocated, or until the data queue of the group of LRCH user devices or the group of DRCH user devices is empty;

wherein a utility function provided to a user is dependent on throughput of the user device.

14. The method of claim 13, wherein the throughput of user device i is updated by:

$$\tilde{r}_i = \alpha r_i + (1-\alpha)d_i,$$

wherein $\tilde{r}_i$ is throughput of user device i after the at least one data frame is transmitted, $r_i$ is throughput of user device i before the at least one data frame is transmitted, $0 < \alpha < 1$ is a filter constant chosen based on the at least one data frame, and $d_1$ is a total normalized rate of user device i.

15. The method of claim 14, wherein the total normalized rate of a user device is a logarithm function dependent on a Signal to Interference and Noise Ratio (SINR) per slot of the user.

16. The method of claim 14, wherein $d_i$ is represented by:

$$d_i = \sum_{t=1}^{T}\sum_{j=1}^{M} x_{ijt}\ln(1+pg_{ij}),$$

wherein $x_{ijt}$ is equal to 1 if user device i is allocated a slot j at symbol t, $g_{ij}$ is SINR per unit transmission power of user device i at slot j, p is transmission power allocated to each slot, M is a number of slots per frame, and T is a number of symbols per frame.

17. The method of claim 16, wherein the SINR of a user device is independent of slots to be allocated to the user device.

18. The method of claim 14, wherein the total normalized rate of a user device is provided by a table mapping SINRs to a fixed set of rates.

19. The method of claim 11, wherein the step of allocating the plurality of LRCHs to the group of LRCH user devices or the step of allocating the plurality of DRCHs to the group of DRCH user devices is performed by a primal ascent algorithm.

20. The method of claim 8, wherein the optimal number of slots for the plurality of DRCH channels is represented by:

$$k^* = \text{argmax}_k\{D(k)\},$$

wherein $D(k)=F^*_D(k)+F^*_L(K-k, F^*_L(K-k)$ denotes the utility sum of the group of LRCH user devices having optimal resource allocation, $F^*_D(k)$ denotes the utility sum of the group of DRCH user devices having optimal resource allocation, k denotes the number of slots allocated to the group of DRCH user devices, and K denotes the total number of slots allocated for the plurality of LRCHs and the plurality of DRCHs of the at least one data frame.

21. The method of claim 1, wherein the step of allocating resources further comprises:
providing the number of slots to be allocated to the plurality of LRCHs and the number of slots to be allocated to the plurality of DRCHs on the at least one data frame; and
performing optimal resource allocation to the group of LRCH user devices and the group of DRCH user devices, respectively, using the number of slots provided.

22. The method of claim 21, wherein the step of performing optimal resource allocation to the group of LRCH user devices or the group of DRCH user devices is implemented by a gradient ascent algorithm.

23. The method of claim 21, wherein the step of performing optimal resource allocation to the group of LRCH user devices or the group of DRCH user devices is implemented by a primal ascent algorithm.

24. A system for supporting consecutive and distributed subcarrier channels, comprising:
an Orthogonal Frequency Division Multiple Access (OFDMA) network;
a base station;
a group of Distributed Resource Channel (DRCH) users; and a group of Localized Resource Channel (LRCH) users;
wherein each of the group of LRCH users or each of the group of DRCH users is provided a utility function, and the utility function is concave and non-decreasing;
wherein a resource allocation objective is provided using the utility function of each of the group of LRCH users and the group of DRCH users, wherein the resource allocation objective includes
the base station optimizing a utility sum of the group of LRCH users based on the utility function for each of the group of LRCH users to produce a utility sum of the group of LRCH users having optimal resource allocation, and
the base station optimizing a utility sum of the group of DRCH users based on the utility function for each of the group of DRCH users to produce a utility sum of the group of DRCH user devices having optimal resource allocation; and
wherein downlink resources of the OFDMA network are allocated to the group of LRCH users or the group of DRCH users by the base station, such that the resource allocation objective is met, wherein the downlink resources of the OFDMA network are allocated by maximizing a sum of the utility sum of the group of LRCH users having optimal resource allocation and the utility sum of the group of DRCH users having optimal resource allocation, maximizing comprising adjusting a number of slots allocated to a plurality of Localized Resource Channels (LRCHs) and adjusting a number of slots allocated to a plurality of Distributed Resource Channels (DRCHs).

25. The system of claim 24, wherein the utility function provided to a user is dependent on throughput of the user.

26. The system of claim 25, wherein the utility function provided to a user is an average throughput of the user.

27. The system of claim 25, wherein the utility function provided to a user is a logarithm function of throughput of the user.

28. The system of claim 25, wherein the utility function provided to a user is a barrier function of throughput of the user.

29. The system of claim 25, wherein the utility function provided to a user is dependent on data queue size of the user.

30. The system of claim 24, wherein the utility function provided to a user is dependent on a delay of the user.

31. The system of claim 24, wherein the downlink resources of the OFDMA network are allocated to the group of LRCH users and the group of DRCH users by a method comprising the steps of:
providing a demarcation type to demarcate at least one data frame, such that the at least one data frame comprises the plurality of DRCHs and the plurality of LRCHs;
determining an optimal number of slots for the plurality of LRCHs and the plurality of DRCHs, respectively; and
performing optimal allocation of the plurality of LRCHs and the plurality of DRCHs to the group of LRCH users and the group of DRCH users, respectively, using the optimal number of slots determined.

32. The system of claim 31, wherein the demarcation type for the at least one data frame is provided such that the plurality of LRCHs span a finite number of symbols of the at least one data frame.

33. The system of claim 31, wherein the demarcation type for the at least one data frame is provided such that the plurality of LRCHs span entire symbols of the at least one data frame.

34. The system of claim 31, wherein the steps of determining the optimal number of slots and performing optimal allocation are performed by an algorithm comprising the steps of:
choosing the number of slots for the plurality of LRCHs or the plurality of DRCHs;

allocating the plurality of LRCHs to the group of LRCH users, such that utility sum of the group of LRCH users is maximized;

allocating the plurality of DRCHs to the group of DRCH users, such that utility sum of the group of DRCH users is maximized; and repeating the previous three steps, until the sum of utility sum for the group of LRCH users and utility sum for the group of DRCH users is maximized;

wherein the total number of slots for the plurality of LRCHs and the plurality of DRCHs is predetermined, each of the group of LRCH users or each of the group of DRCH users has finite data queue, and transmission power is equally spread among all the slots during each symbol of the at least one data frame.

35. The system of claim 34, wherein the step of allocating the plurality of LRCHs to the group of LRCH users or the step of allocating the plurality of DRCHs to the group of DRCH users is performed by a gradient ascent algorithm.

36. The system of claim 35, wherein the gradient ascent algorithm comprising the steps of:

determining a triplet {user i, slot j, symbol t}, by looking for the largest gradient of the utility sum of the group of LRCH users or the group of DRCH users, wherein the slot j at symbol t is allocated to user i;

updating throughput of user i;

reducing data queue size of user i; and repeating the previous three steps until all slots for the plurality of LRCHs or the plurality of DRCHs of the at least one data frame are allocated, or until data queue of the group of LRCH users or the group of DRCH users is empty;

wherein the utility function provided to a user is dependent on throughput of the user.

37. The system of claim 36, wherein the throughput of user i is updated by:

$$\tilde{r}_i = \alpha r_i + (1-\alpha) d_i,$$

Wherein $\tilde{r}_i$ is the throughput of user i after the at least one data frame is transmitted, $r_i$ is throughput of user i before the at least one data frame is transmitted, $0 < \alpha < 1$ is a filter constant chosen based on the at least one data frame, and $d_i$ is a total normalized rate of user i.

38. The system of claim 37, wherein the total normalized rate of a user is a logarithm function dependent on a Signal to Interference and Noise Ratio (SINR) per slot of the user.

39. The system of claim 37, wherein $d_i$ is represented by:

$$d_i = \sum_{t=1}^{T} \sum_{j=1}^{M} x_{ijt} \ln(1 + p g_{ij}),$$

wherein $x_{ijt}$ is equal to 1 if user i is allocated slot j at symbol t, $g_{ij}$ is SINR per unit transmission power of user i at slot j, p is transmission power allocated to each slot, M is a number of slots per frame, and T is a number of symbols per frame.

40. The system of claim 39, wherein the SINR of a user is independent of slots to be allocated to the user.

41. The system of claim 37, wherein the total normalized rate of a user is provided by a table mapping SINRs to a fixed set of rates.

42. The system of claim 34, wherein the step of allocating the plurality of LRCHs to the group of LRCH users or the step of allocating the plurality of DRCHs to the group of DRCH users is performed by a primal ascent algorithm.

43. A method of a base station allocating downlink resources to a group of Distributed Resource Channel (DRCH) users and a group of Localized Resource Channel (LRCH) users in an Orthogonal Frequency Division Multiple Access (OFDMA) network, comprising the steps of:

assigning a utility function to each of the group of LRCH users and each of the group of DRCH users, wherein the utility function assigned to an LRCH or a DRCH user is a logarithm function of throughput of the LRCH or DRCH user;

providing a demarcation type to demarcate at least one data frame, such that the at least one data frame comprises a plurality of Distributed Resource Channels (DRCHs) and a plurality of Localized Resource Channels (LRCHs), and the LRCHs span a finite number of symbols of the at least one data frame;

choosing a number of slots for the plurality of DRCHs;

the base station allocating the plurality of LRCHs to the group of LRCH users, such that a utility sum of the group of LRCH users is maximized;

the base station allocating the plurality of DRCHs to the group of DRCH users, such that a utility sum of the group of DRCH users is maximized; and repeating the previous three steps, until the sum of the utility sum for the group of LRCH users and the utility sum for the group of DRCH users is maximized; and wherein a total number of slots for the plurality of LRCHs and the plurality of DRCHs is given, each of the group of LRCH users or each of the group of DRCH users has a finite data queue, and transmission power is equally spread among all the slots during each symbol of the at least one data frame.

* * * * *